United States Patent [19]
Postelwait

[11] Patent Number: 5,802,680
[45] Date of Patent: Sep. 8, 1998

[54] TWO-PIECE BOLT AND SADDLE FOR WIRE ROPE CLIPS

[75] Inventor: Larry L. Postelwait, Catoosa, Okla.

[73] Assignee: The Crosby Group, Inc., Tulsa, Okla.

[21] Appl. No.: 911,747

[22] Filed: Aug. 15, 1997

[51] Int. Cl.$^6$ .............................. F16G 11/00; F16B 37/00
[52] U.S. Cl. .................. 24/135 R; 24/135 N; 24/136 B; 411/107; 411/180
[58] Field of Search ............................ 24/135 R, 135 N, 24/135 L, 135 K, 135 A, 136 B; 411/107, 180, 311, 340; 403/282, 396

[56] References Cited

U.S. PATENT DOCUMENTS

| | | | |
|---|---|---|---|
| 841,165 | 1/1907 | Meech . | |
| 851,822 | 4/1907 | Meech . | |
| 1,298,118 | 3/1919 | Strom . | |
| 1,507,316 | 9/1924 | Kemper et al. . | |
| 1,799,360 | 4/1931 | Fekete . | |
| 1,888,669 | 11/1932 | Hossfeld | 24/135 R |
| 1,976,533 | 10/1934 | Affleck et al. | 24/135 |
| 1,996,128 | 4/1935 | Thomson | 411/107 |
| 2,058,618 | 10/1936 | Patzig | 287/20 |
| 2,061,768 | 11/1936 | Hossfeld | 24/135 R |
| 2,380,287 | 7/1945 | Baumbach | 85/19 |
| 2,544,304 | 3/1951 | Eckenbeck et al. | 411/180 |
| 3,182,362 | 5/1965 | Dobrikin | 22/203 |
| 3,333,303 | 8/1967 | St. Pierre | 24/125 |
| 4,215,463 | 8/1980 | Crook | 29/461 |
| 4,230,016 | 10/1980 | Merrell | 85/9 |
| 4,346,619 | 8/1982 | Fehling | 74/551.1 |
| 4,471,159 | 9/1984 | Frank, Jr. | 174/94 |
| 4,684,283 | 8/1987 | Lewis, Jr. | 403/299 |
| 5,427,469 | 6/1995 | Galarnyk | 403/396 |
| 5,464,311 | 11/1995 | Hiraguri et al. | 411/340 |
| 5,604,968 | 2/1997 | Fulbright et al. | 297/407.05 |

OTHER PUBLICATIONS

"the Crosby ®Group, Inc. Blocks & Fittings for Wire Rope & Chain ", 1996, p. 39.

Primary Examiner—Victor N. Sakran
Attorney, Agent, or Firm—Head, Johnson & Kachigian

[57] ABSTRACT

A wire rope clip comprising a two-piece bolt and saddle. The clip comprises first and second bolts, each having a head, a threaded end, and a plurality of splines fashioned proximate the head. The clip further comprises first and second saddles, each having a base, a first orifice and a second orifice. A first nut engages the threaded end of the first bolt and a second nut engages the threaded end of the second bolt.

7 Claims, 1 Drawing Sheet

TWO-PIECE BOLT AND SADDLE FOR WIRE ROPE CLIPS

BACKGROUND OF THE INVENTION

1. Field of the Invention.

The present invention relates to a wire rope clip. In particular, the present invention is directed to a two-piece bolt and saddle for wire rope clips, which will grip and secure to the exterior surface of a rope or cable.

2. Related Art.

Previously existing wire rope clips have been forged and comprised of two identical clamps, each having a long threaded leg and an orifice for receiving a threaded leg of the corresponding clamp. The forged pieces were designed to be assembled together for clamping a wire rope. An example of such a wire rope clip is a FIST GRIP® clip manufactured by The Crosby Group, Inc.

Another example of a wire rope clamp is shown in U.S. Pat. No. 3,333,303 to St. Pierre. The St. Pierre wire rope clamp is constructed of two identical forgings secured together by a pair of conventional bolts. The St. Pierre wire rope clamp eliminates the need to forge a long leg on the clamps by replacing the leg with a standard bolt that passes through apertures formed within the clamps. The clamps are provided with a sunken hexhead socket for making the bolt heads non-rotatable. Although the sunken hexhead provided on the forged piece prevents rotation of the bolt, the sunken hexhead does not secure the bolts within the apertures of the unassembled clamps. Since the bolts are free to slide in or out of a clamp, difficulties arise in assembling the completed wire rope clamp.

SUMMARY OF THE INVENTION

Consequently, it is desirable to provide a wire rope clamp having identical clamps or saddles for securing a wire rope therebetween.

It is a further object to provide a wire rope clamp wherein no long leg is forged thereon, but instead is replaced by a bolt.

It is an additional object to provide a wire rope clamp wherein a bolt is non-rotatable and is removably secured in a respective saddle so that the wire rope saddle may be assembled with greater ease without the difficulties associated with unintentional bolt disengagement from the saddle.

The wire rope clip of the present invention includes a first and second bolt each having a head, a threaded end and a plurality of splines. The splines are fashioned on the bolts proximate the head. The first bolt is received in a first orifice fashioned in a first saddle. The second bolt is received in a first orifice fashioned in a second saddle. The bolts are preferably press fit into the orifices whereby the splines on the bolts engage the walls of the first orifices so that the bolts are removably secured therein. The splines not only prevent rotation of the bolts, but also keep the bolts secured into their respective saddles.

Additionally, each saddle has a second orifice fashioned therein. The second orifice of the first saddle is for receiving the threaded end of the second bolt. The second orifice of the second saddle is for receiving the threaded end of the first bolt. The saddles are secured together by means of a first nut and a second nut that bias against the base of the second saddle and the base of the first saddle, respectively. Both the first saddle and the second saddle have a rope engaging surface fashioned between their respective first orifice and second orifice. Each rope engaging surface is fashioned on the surface opposite the base of each saddle. The wire rope clip is preferably constructed such that the first orifice on the first and second saddles are provided with a chamfered recess proximate the base of each respective saddle for receiving bolts having countersunk heads. By constructing the wire rope clip in this manner, the heads of the first and second bolts are flush with the base of the first and second saddles.

By constructing the two identical saddles, and securing the saddles together by means of the first bolt and the second bolt, a wire rope may be securely clamped by the wire rope clip.

DETAILED DESCRIPTION OF THE PREFERRED EMBODIMENTS

Figure 1:
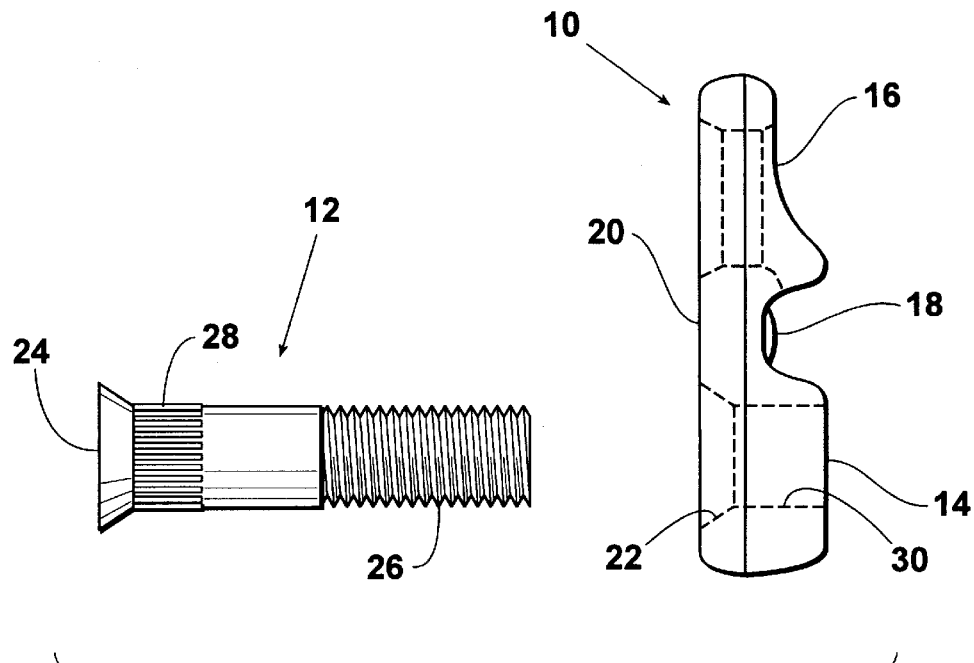
FIG. 1 illustrates a side elevation view of a first saddle and first bolt of a wire rope clip of the present invention.

Referring to the drawings in detail. FIG. 1 illustrates a preferred embodiment of first saddle 10 and first bolt 12 of the wire rope clip. First saddle 10 is provided with first orifice 14 and second orifice 16. Additionally, first saddle 10 is provided with rope engaging surface 18 and base 20 formed on an opposite side thereof.

In the preferred embodiment, first orifice 14 is formed having a chamfered recess 22 in base 20. First orifice 14 receives first bolt 12. First bolt 12 is preferably provided with head 24, threaded end 26 and splines 28. The splines 28 in the present embodiment are parallel to the axis of the first bolt. The head 24 is preferably countersunk to correspond with chamfered recess 22. Splines 28 or ribs engage wall 30 of first orifice 14. The splines 28 interfere with or dig into wall 30 of first orifice 14 for preventing first bolt 12 from rotating within first orifice 14 and for securing first bolt 12 within first orifice 14.

Although FIG. 1 displays first saddle 10 and first bolt 12, it is to be understood that, in the preferred embodiment, a second saddle and a second bolt are identical thereto and function in the same manner.

Figure 2:
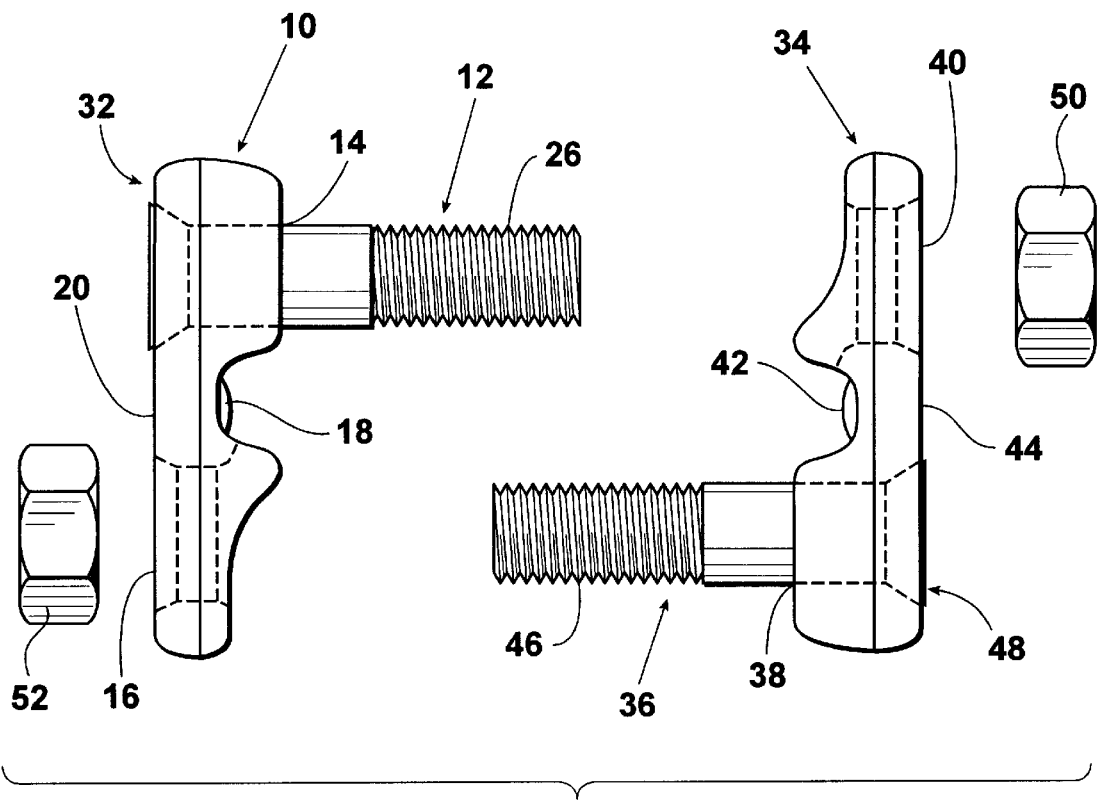
FIG. 2 an exploded side elevation view of a wire rope clip.

Referring to FIG. 2, an exploded side elevation view of a wire rope clip is provided. First saddle 10 is shown with first bolt 12 affixed thereto. First bolt 12 preferably is press fit within first orifice 14. It is noted that chamfered recess 22 receives countersunk head 24 as shown in FIG. 1, thereby resulting in flush surface 32. Opposite first saddle 10 is second saddle 34. Second saddle 34 is shown with second bolt 36 affixed thereto. Second bolt 36 is preferably press fit within first orifice 38 formed in second saddle 34. Additionally, second orifice 40 is provided in second saddle 34.

Second saddle 34 is provided with rope engaging surface 42 on one side and base 44 on an opposite side. Similar to first saddle 10, second saddle 34 also has a chamfered recess for receiving a countersunk head of second bolt 36. Second bolt 36 includes a threaded end 46 and splines or ribs, similar to first bolt 12. The union of the chamfered recess of second saddle 34 and the corresponding countersunk head of second bolt 36 result in flush surface 48 on base 44 of second saddle 34.

Threaded end 26 of first bolt 12 passes through second orifice 40 of second saddle 34 and engages first nut 50. Similarly, threaded end 46 of second bolt 36 passes through second orifice 16 of first saddle 10 for engaging second nut 52. First nut 50 biases against base 44 of second saddle 34 and second nut 52 biases against base 20 of first saddle 10. Therefore, rope engaging surface 18 of first saddle 10 is positioned opposite rope engaging surface 42 of second saddle 34. Rope engaging surfaces 18 and 42 are designed to engage a wire or other type of rope therebetween to secure the rope therein.

By utilizing the wire rope clip of the invention, first nut 50 and second nut 52 can be installed in such a way as to enable an operator to swing a wrench in a full arc for fast installation.

In practice, first bolt 12 is press fit or forced within first saddle 10 and splines 28 engage wall 30 within first orifice 14 of first saddle 10. Splines 28 prevent first bolt 12 from rotating within first saddle 10. Additionally, splines 28 removably secure first bolt 12 within first orifice 14. A similar assembly is constructed with respect to second saddle 34 and second bolt 36. By providing splines 28 for engaging wall 30 of first orifice 14 and for engaging the wall of second orifice 38 of second saddle 34, an operator is not inconvenienced by accidental disengagement of first bolt 12 from first sadole 10 and/or accidental disengagement second bolt 36 from second saddle 34.

First saddle 10 is positioned such that rope engaging surface 18 engages a wire rope and positions second saddle 34 such that threaded end 26 of first bolt 12 passes through second orifice 40 of second saddle 34. Additionally, second saddle 34 is positioned such that rope engaging surface 42 also engages a wire rope. First nut 50 is then threaded over threaded end 26 of first bolt 12 and second nut 52 is threaded onto threaded end 46 of second bolt 36. In this manner, two pieces of wire rope may be securely clamped by the wire rope clip of the present invention.

The wire rope clips may be utilized on turnback loops formed from a single piece of cable or to splice two pieces of wire rope together. It is to be understood that the wire rope clips may also be utilized for other applications where traditional wire rope clips have been utilized.

Whereas, the present invention has been described in relation to the drawings attached hereto, it should be understood that other and further modifications, apart from those shown or suggested herein, may be made within the spirit and scope of this invention.

What is claimed is:

1. A wire rope clip comprising:

a first bolt having a head and a threaded end, said first bolt having a plurality of splines fashioned proximate said head;

a second bolt having a head and a threaded end, said second bolt having a plurality of splines fashioned proximate said head;

a first saddle having a base, a first orifice and a second orifice, said first orifice for receiving said first bolt therein and for frictionally press fit interference engaging said splines on said first bolt, and securing said first bolt to said first saddle, said first saddle having a rope engaging area between said first and said second orifices;

a second saddle having a base, a first orifice and a second orifice, said first orifice for receiving said second bolt therein and for frictionally press fit interference engaging said splines on said second bolt, and securing said second bolt to said second saddle, said second saddle having a rope engaging area between said first and said second orifices, said first bolt passing through said second orifice of said second saddle, said second bolt passing through said second orifice of said first saddle;

a first nut for engaging said threaded end of said first bolt, said first nut for biasing against said base of said second saddle; and a second nut for engaging said threaded end of said second bolt, said second nut for biasing against said base of said first saddle.

2. A wire rope clip as set forth in claim 1 wherein each said spline is parallel to an axis of said bolt.

3. A wire rope clip as set forth in claim 1 wherein said first bolt has a diameter at said splines larger than said first orifice and wherein said second bolt has a diameter at said splines larger than said first orifice.

4. A wire rope clip according to claim 1, wherein said first bolt is press fit into said first orifice for engaging said splines and said first orifice of said first saddle and wherein said second bolt is press fit into said first orifice for engaging said splines in said first orifice of said second saddle.

5. A wire rope clip according to claim 1, wherein said first and said second bolts have countersunk heads, said first orifice of said first saddle and said first orifice of said second saddle have a chamfered recess for receiving said countersunk heads of said first bolt and said second bolts whereby said head on said first bolt is flush against said base on said first saddle and said head on said second bolt is flush against said base on said second saddle when said first bolt is inserted in said first saddle and said second bolt is inserted in said second saddle.

6. A wire rope clip as set forth in claim 1 including a cylindrical shank portion on each said bolt between said threaded end and said splines.

7. A method of clamping a wire rope which comprises:

press fit engaging a first bolt having a head, a threaded end and splines with a first orifice in a first saddle;

press fit engaging a second bolt having a head, a threaded end and splines with a second orifice in a second saddle;

inserting a wire rope into a rope engaging area in said first saddle and a rope engaging area in said second saddle;

engaging a first nut on said first bolt threaded end for biasing against a base of said second saddle; and engaging a second nut on said second bolt threaded end for biasing against a base of said first saddle.

\* \* \* \* \*